United States Patent [19]
Belge et al.

[11] Patent Number: 5,458,443
[45] Date of Patent: Oct. 17, 1995

[54] AUTOMATIC DRILLING TOOL ESPECIALLY FOR A ROBOT

[75] Inventors: David N. Belge; Kurt Grossheim, both of Hamburg, Germany

[73] Assignee: Deutsche Aerospace Airbus GmbH, Hamburg, Germany

[21] Appl. No.: 173,559

[22] Filed: Dec. 22, 1993

[30] Foreign Application Priority Data

Dec. 29, 1992 [DE] Germany .......................... 42 44 407.1

[51] Int. Cl.⁶ .......................... B23B 39/20; B23B 39/14; B23B 47/20; B23B 47/34
[52] U.S. Cl. ..................... 408/35; 408/16; 408/61; 408/67; 408/129; 408/237
[58] Field of Search ................. 408/16, 35, 56, 408/61, 67, 129, 236, 237

[56] References Cited

U.S. PATENT DOCUMENTS

| | | | |
|---|---|---|---|
| 3,806,691 | 4/1974 | Roach | 408/236 |
| 4,037,982 | 7/1977 | Clement | 408/61 |
| 4,417,834 | 11/1983 | Jagers | 408/16 |
| 4,548,345 | 10/1985 | Puritz et al. | 227/58 |

*Primary Examiner*—Steven C. Bishop
*Attorney, Agent, or Firm*—W. G. Fasse; W. F. Fasse

[57] ABSTRACT

A drilling tool is adapted for incorporation into a riveting robot. For this purpose, the drilling tool with its spindle head is mounted on a slide that is motor driven for displacement in the Z-direction of an XYZ coordinate system. The slide in turn is mounted on a console provided with a flange to be secured or docked to the riveting robot. The console is rotatable about its longitudinal axis that extends perpendicularly to the drill spindle axis and intersects the latter approximately in the center of the spindle axis. The drill spindle is rotatably mounted in a spindle head and carries a drive wheel approximately in the center between the spindle ends. The drive wheel is meshing or cooperating with a power transmission train from a motor that is also secured to the slide and moves up and down with the slide and thus with the spindle head. Another motor drives the up and down movement of the spindle head. This type of arrangement permits positioning the drill bit in difficult locations. Overhead drilling, sideways drilling is possible in addition to the normal downward drilling.

19 Claims, 8 Drawing Sheets

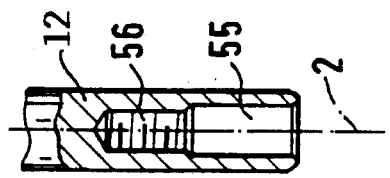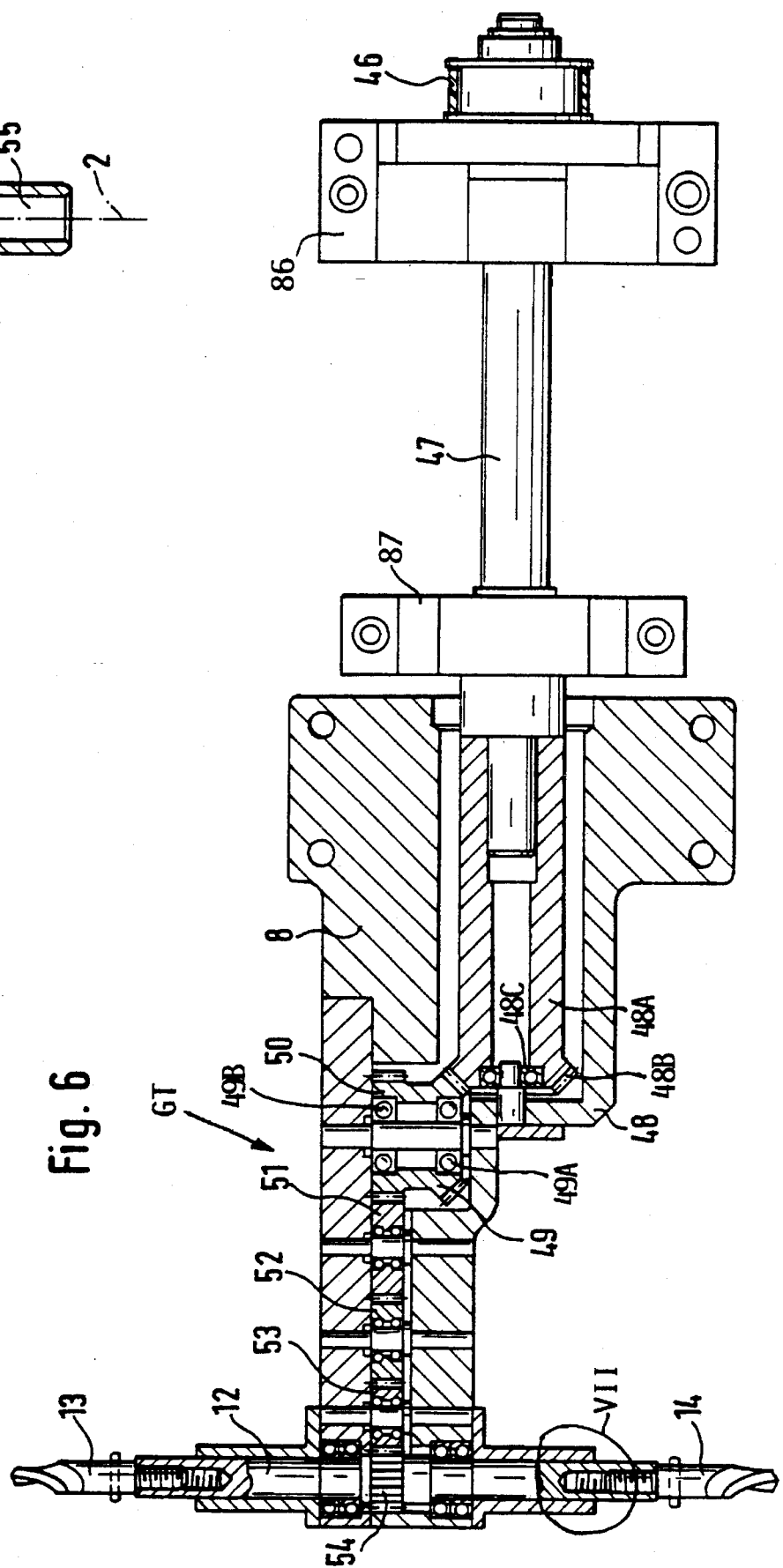

5,458,443

AUTOMATIC DRILLING TOOL ESPECIALLY FOR A ROBOT

FIELD OF THE INVENTION

The invention relates to an automatic drilling tool for producing rivet holes, whereby the automatic drilling tool participates in an automated riveting operation performed by a riveting robot, for example in the aircraft industry.

BACKGROUND INFORMATION

German Patent Publication (DE-PS) 3,232,093, corresponding to U.S. Pat. No. 4,548,345 (Puritz et al.), issued on Nov. 22, 1981, discloses an automatic riveting robot including the following components: a drilling feed advance unit, a rivet supply unit, and a riveting unit. Each of these units is mounted in a controllable manner to a support console that extends in a radial direction relative to a riveting position or rather radially relative to an axis extending centrally through a riveting hole. Each of these units is movable in the required directions. Pneumatic couplings, electrical connectors, as well as clamping mechanisms for securing the riveting machine to a manufacturing robot are mounted on the support console. Such a conventional machine is capable of producing rivet connections, for example on an aircraft structural component in accordance with a respective riveting program, whereby the drilling of the riveting holes, the insertion of the rivets into the holes, and the setting of the rivets takes place in an automatic manufacturing sequence.

U.S. Pat. No. 4,548,345 leaves room for improvement with regard to the ability of the robot to position the drilling tool into locations that are difficult to access. More specifically, the arrangement of the other components of the robot, such as the rivet inserting and rivet setting units, makes it difficult to drill the rivet hole in positions that are hard to be reached by the drilling tool.

OBJECTS OF THE INVENTION

In view of the foregoing it is the aim of the invention to achieve the following objects singly or in combination:

- to mount an automatic drilling tool on a support or console of a riveting robot in such a manner that the drilling tool can be displaced toward and away from any rivet location;
- to provide the support or console with clamping elements for docking the console and thus the drilling tool movably mounted on the console to a riveting robot and to also provide the required couplings for the energy and control signal transmission to the drilling tool, whereby rivet positions that are hard to reach for the tool, can still be properly drilled by the tool;
- to position and control the drilling tool so that it can be located precisely relative to the coordinates of a drilling location for drilling each precision rivet hole in a single drilling; and
- to control the discharge of drilling chips while also avoiding an over heating of the drill bits of the present drilling tool.

SUMMARY OF THE INVENTION

The above objects have been accomplished according to the invention by mounting the drilling tool on a support or console of a riveting robot in such a way that the drilling tool is supported on a guide on which the drilling tool is displaceable in the Z-direction by a motor drive, wherein the guide is realized as a slide for a drilling spindle carrier supporting a drilling head in which the drilling spindle is in turn supported for rotation. In the preferred embodiment the drilling spindle carries a drill bit at each of its ends and a drive wheel for rotating the drilling spindle is arranged approximately in the center of the length of the drilling spindle which is provided at each of its ends with a bore for holding a drill bit at each end. The support or console that carries the slide is in turn rotatably secured to the robot, whereby the rotational axis of the console or support intersects the longitudinal axis of the drilling spindle approximately in the center of the drilling spindle. This arrangement of the components according to the invention makes it possible to position the drilling head in rivet positions for drilling rivet holes in positions that are hard to access, including positions that require overhead drilling.

According to the invention it is now possible to drill with a single boring operation bore holes having a inner diameter for the insertion of rivets. The drive motors for the rotation of the drilling spindle and for the feed advance of the drilling spindle upwardly and downwardly, are precision controllable. This also applies to the positioning motors for a precise locating of the drilling spindle with its longitudinal axis in alignment with the axis of the hole to be drilled. In other words, locating the position where a hole is to be drilled is now possible with high precision. Each of the individual controlling steps of an operational sequence can now be monitored on a monitor. Further, the uncontrolled discharge of drilling chips is avoided and the individual drill bits are cooled to prevent overheating.

BRIEF DESCRIPTION OF THE DRAWINGS

In order that the invention may be clearly understood, it will now be described, by way of example, with reference to the accompanying drawings, wherein:

FIG. 6 is a sectional view along section line VI—VI in FIG. 5;

FIG. 7 shows a detail VII in FIG. 6;

DETAILED DESCRIPTION OF PREFERRED EXAMPLE EMBODIMENTS AND OF THE BEST MODE OF THE INVENTION

Figure 1:
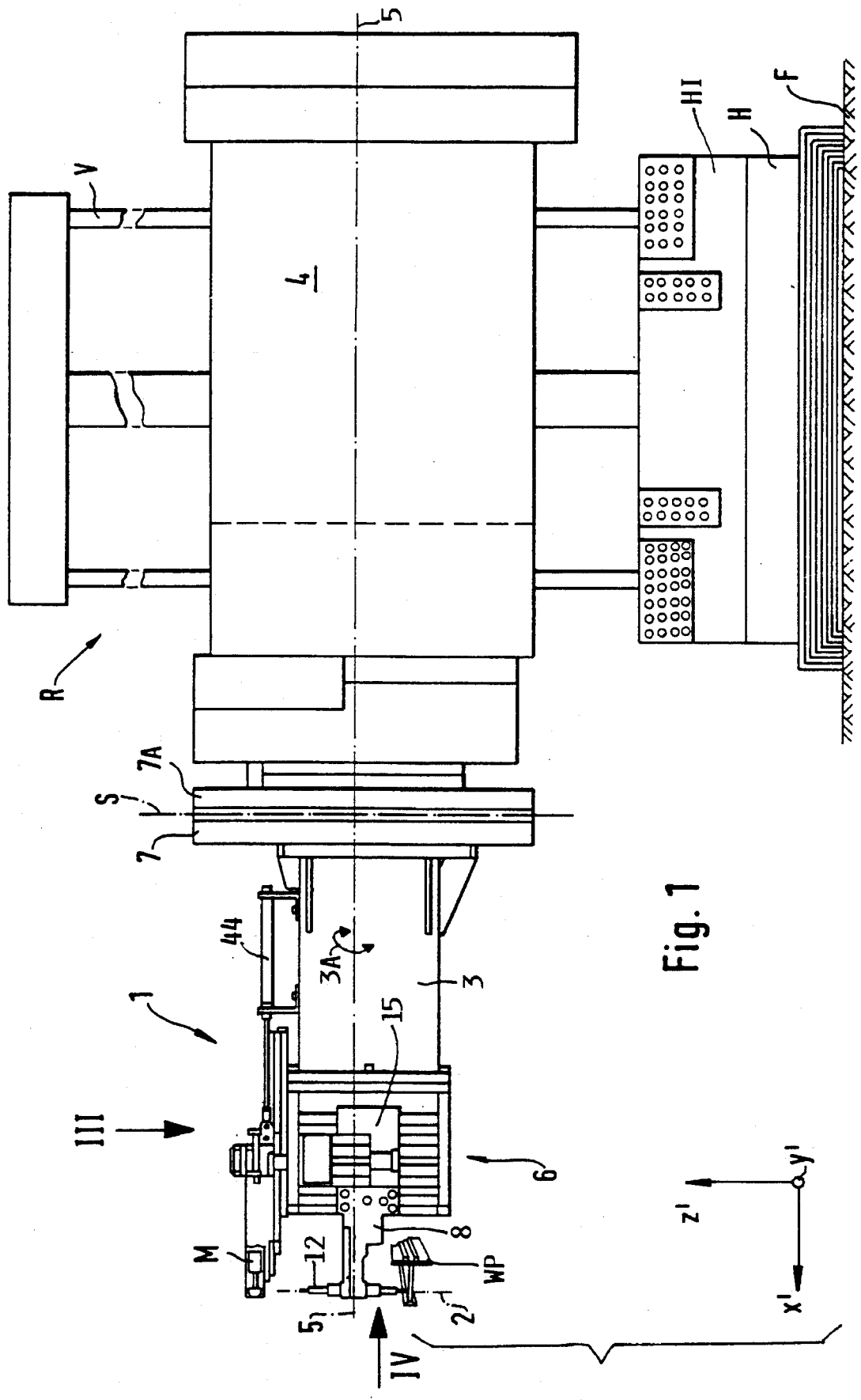
FIG. 1 is a simplified plan view of a drilling tool according to the invention supported by a console which in turn is rotatably docked to a riveting robot.

FIG. 1 shows a schematic illustration of a riveting robot R comprising a horizontal guide support H mounted to a foundation F. The support H or components thereof are movable in a horizontal plane in the X' direction and in the Y' direction as is conventional. A component H1 of the horizontal guide H carries a vertical guide frame V. A tool positioning unit 4 having a rotational axis 5 is movable up and down in the Z' direction along the vertical rails of the vertical guide frame V. The motors and drive trains are not shown.

According to the invention, a drilling tool 1 is supported by a support or console 3 which in turn has a flange 7 that is docked to or secured to a flange 7A of the tool positioning unit 4. An interface S is formed between the two flanges 7 and 7A. The two flanges 7, 7A and thus the console 3 are rotatable or rather tiltable back and forth about the horizontal axis 5 of the tool positioning unit 4 as indicated by the double arrow 3A. The drilling tool 1 comprises a drilling unit 6 that includes a spindle head 8 carrying a spindle 12 and a measuring or sensing unit M. The drill spindle 12 has a central longitudinal axis 2 that must be vertically aligned with a central vertical axis of a rivet hole to be drilled in a work piece WP. The measuring unit M is displaceable in the X' direction by a piston cylinder device 44 as will be described in more detail below. The measuring unit M measures the position of the spindle axis 2.

Figure 2:
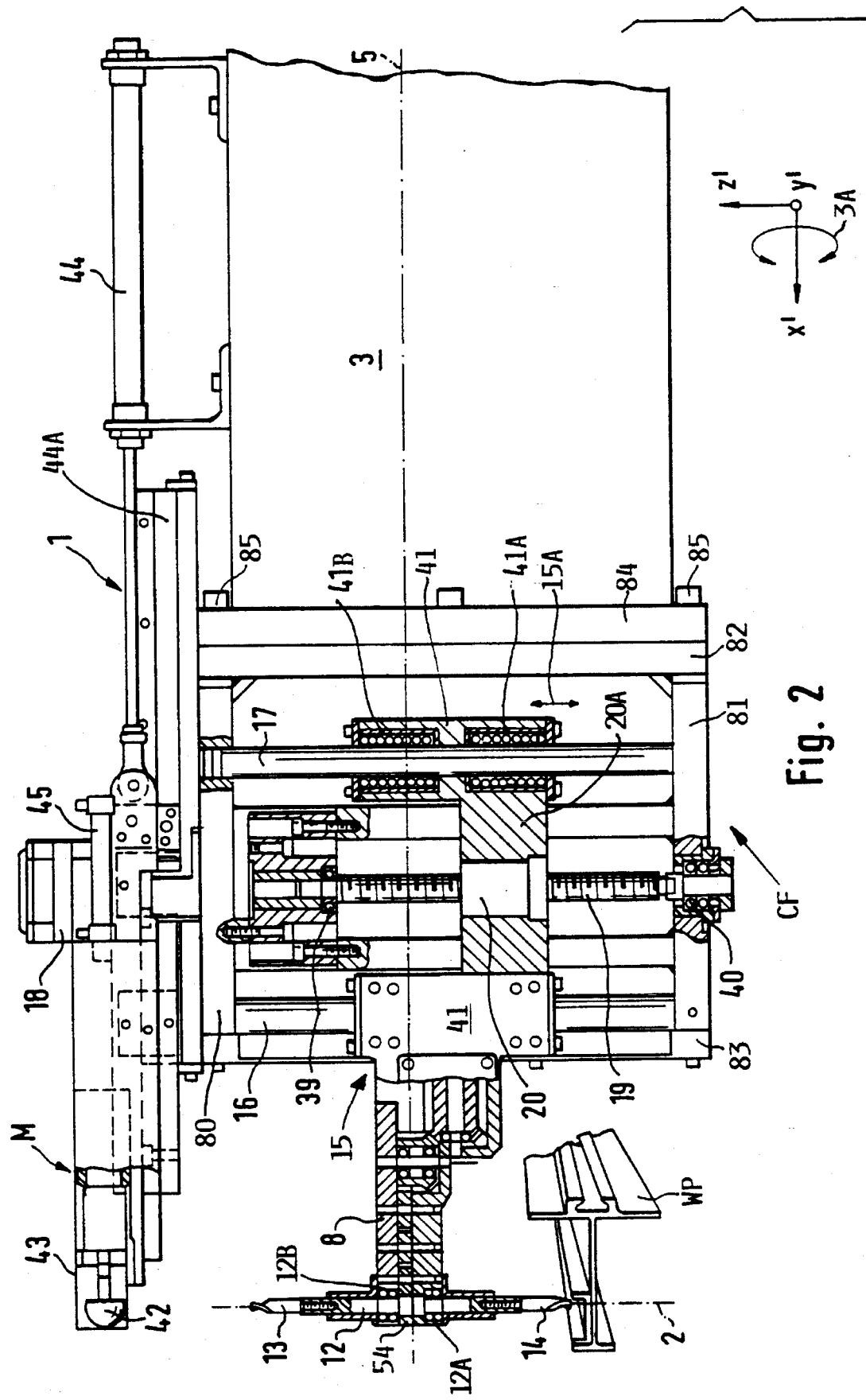
FIG. 2 is an enlarged view, partially in section, of the left-hand end of the console carrying the drilling tool as viewed substantially in the same direction as in FIG. 1.
Figure 3:
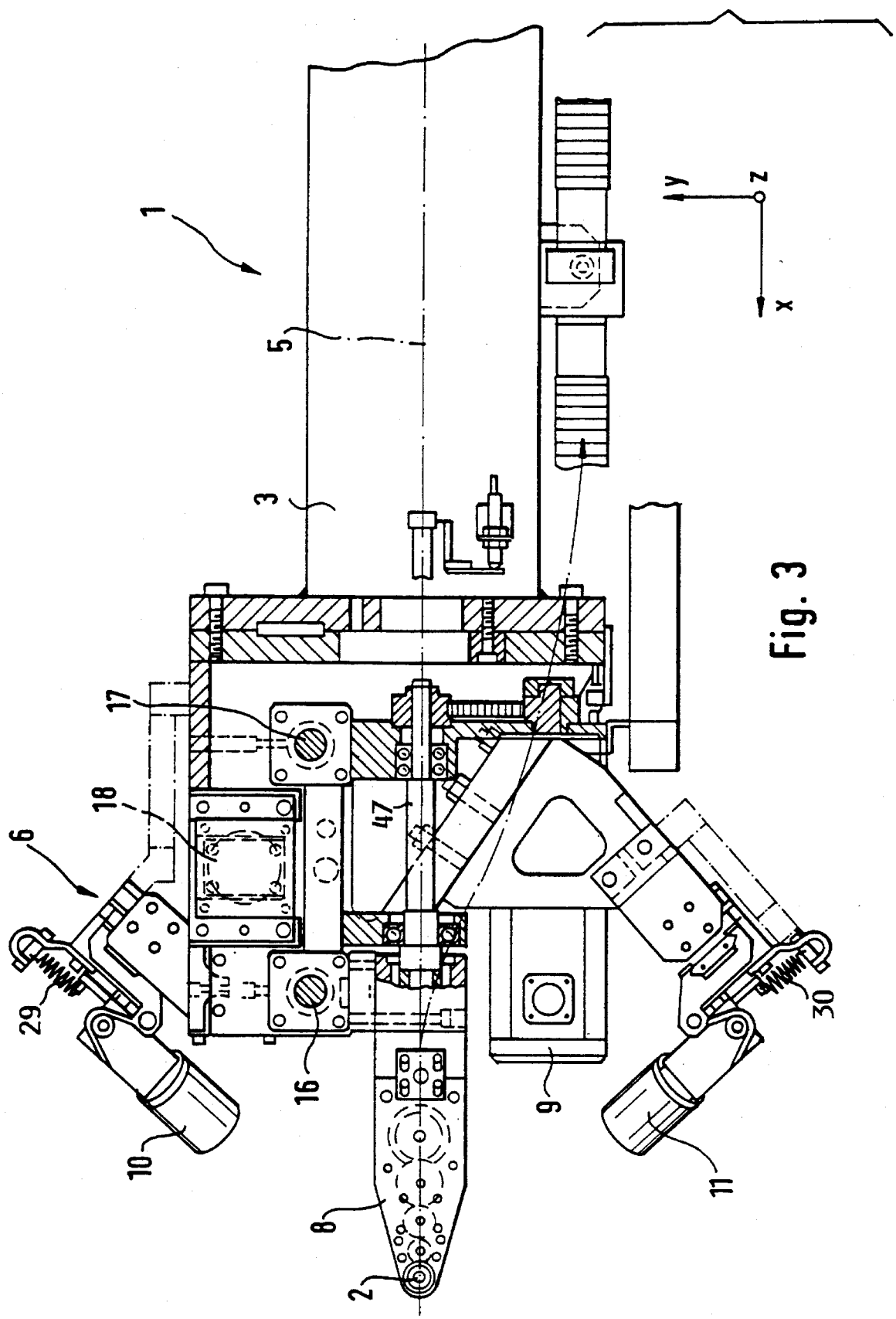
FIG. 3 is a view, partially in section, in the direction of the arrow III in FIG. 1.

Referring to FIGS. 2 and 3, the partially sectional view of FIG. 2 shows an enlarged side view of the left-hand end of FIG. 1, while FIG. 3 illustrates the arrangement of two video cameras, but omitting the measuring unit M shown in FIG. 1. Referring to FIG. 2, the spindle head 8 is movable vertically up and down in the Z' direction by an electric motor 18 that drives a spindle 19 which in turn cooperates with a spindle nut 20 rigidly secured to a cross piece 20A forming a vertical slide 15 carried by two double ball boxes 41 that are guided for an up and down movement along guide posts 16 and 17. Each ball box has a lower section 41A and an upper section 41B for a precise vertical guiding of the spindle head 8 that carries at its left-hand end the drilling unit 6 including a drill spindle 12 mounted in a rotatable manner by two bearings 12A and 12B. The drill spindle 12 carries two drill bits 13 and 14, one at each end. For this purpose, the spindle ends are provided with axial bores for holding the drill bits as will be described in more detail below with reference to FIG. 7. The drill bits 13 and 14 have different diameters and are available for a drilling operation as controlled by the operator or by a program in the central processing unit of the riveting robot R. Operating one or the other drill bit 13, 14 is made possible by rotating the entire console 3 about the longitudinal axis 5 of the console 3 through 180°. The axis 5 extends at right angles to the vertical axis 2 of the drill spindle 12. The two axes 2 and 5 intersect each other substantially in the center of the drill spindle 12. If the console 3 is rotated only through an angle of 90° it is possible to drill holes that extend horizontally with their central longitudinal hole axis. Overhead drilling is also possible.

The vertical slide 15 formed by the ball boxes 41 with the cross piece 20A and the spindle nut 20 is movable up and down along the guide posts 16 and 17 as indicated by the arrow 15A. For this purpose, the spindle 19 is mounted at its upper end in a bearing 39 and at its lower end in a bearing 40. The bearings 39 and 40 and the guide posts or columns 16 and 17 are mounted in a carrier frame CF having an upper cross plate 80, a lower cross plate 81 held together by a mounting flange 82 and a vertical section 83. The mounting flange 82 in turn is secured to a flange 84, for example, by screw 85. The flange 84 is rigidly secured to the console 3 and is thus rotatable with the console 3 about the axis 5. The motor 18 for driving the spindle 19 thereby moving the slide 15 up or down is mounted on the upper cross plate 80.

A measuring unit M is mounted on the carrier frame CF. The measuring unit M comprises a measuring sensor or probe 42, which in turn is mounted for axial movement in a protection pipe or housing 43. The housing 43 and the sensor 42 are axially movable with the aid of a piston cylinder device 44. For this purpose, the housing 43 is slideably mounted on the upper cross member 80. Further, the probe 42 itself is slideably movable within the housing 43 by a further piston cylinder device 45 which can move the sensor or probe 42 out of its protective housing 43.

The measuring unit M makes sure that the coordinates of a work piece and more specifically, the coodinates of holes to be drilled can be checked and corrected in accordance with corresponding coordinates stored in a memory of the central control of the riveting robot R. For this purpose, the drilling tool 1 is advanced by the positioning unit 4 to a point that has a determined spacing relative to a reference point of the respective work piece WP. Thereafter, the probe or sensor 42 is moved together with its protective housing 43 by the pneumatic piston cylinder device 44 through a predetermined distance that corresponds to the illustrated position of the probe 42 in FIG. 2 in axial alignment with the axis 2 of the drill spindle 12 and thus of the drill bits 13 and 14. In the shown position, the probe 42 must still be moved out of its protective housing 43 until it contacts the work piece WP for performing the actual measuring or sensing. All the distances traversed are known during the sensing or measuring. Therefore, the actual position of the reference point on the work piece WP can be ascertained by the measurement. As a result, it is now possible that inaccuracies, for example, caused by the motor drives of the robot R or by the clamping of the work piece in a jig, may now be corrected. Such correction is performed in that the exact coordinates of the point previously ascertained on the structural component are now correlated to that point. If necessary, a repositioning of the work piece may have to be performed in accordance with information provided on a display or the like in the centrol processing unit of the robot R.

FIG. 3 shows the arrangement of two video cameras 10 and 11 trained to view one or the other of the drill bits 13 and 14 depending on the position of the cameras. FIG. 3 also shows the drive motor 9 for the rotation of the drill spindle 12. The drive train from the electric motor 9 through the spindle drive shaft 47 and respective gear trains will be described in more detail below with reference to FIGS. 5 and 6. The motor 9 rotates the drilling spindle 12 to drill a hole while the motor 18 assures the feed advance. One of the drill bits 13 or 14 has a right-hand pitch while the other drill bit has a left-hand pitch or the drive direction in the drive train including the motor 9 is reversible for driving the drill bits in the proper rotational direction. The motor 18 is reversible for a feed advance of the drill bit in one or the opposite direction along the axis 2 of the spindle 12.

Figure 4:
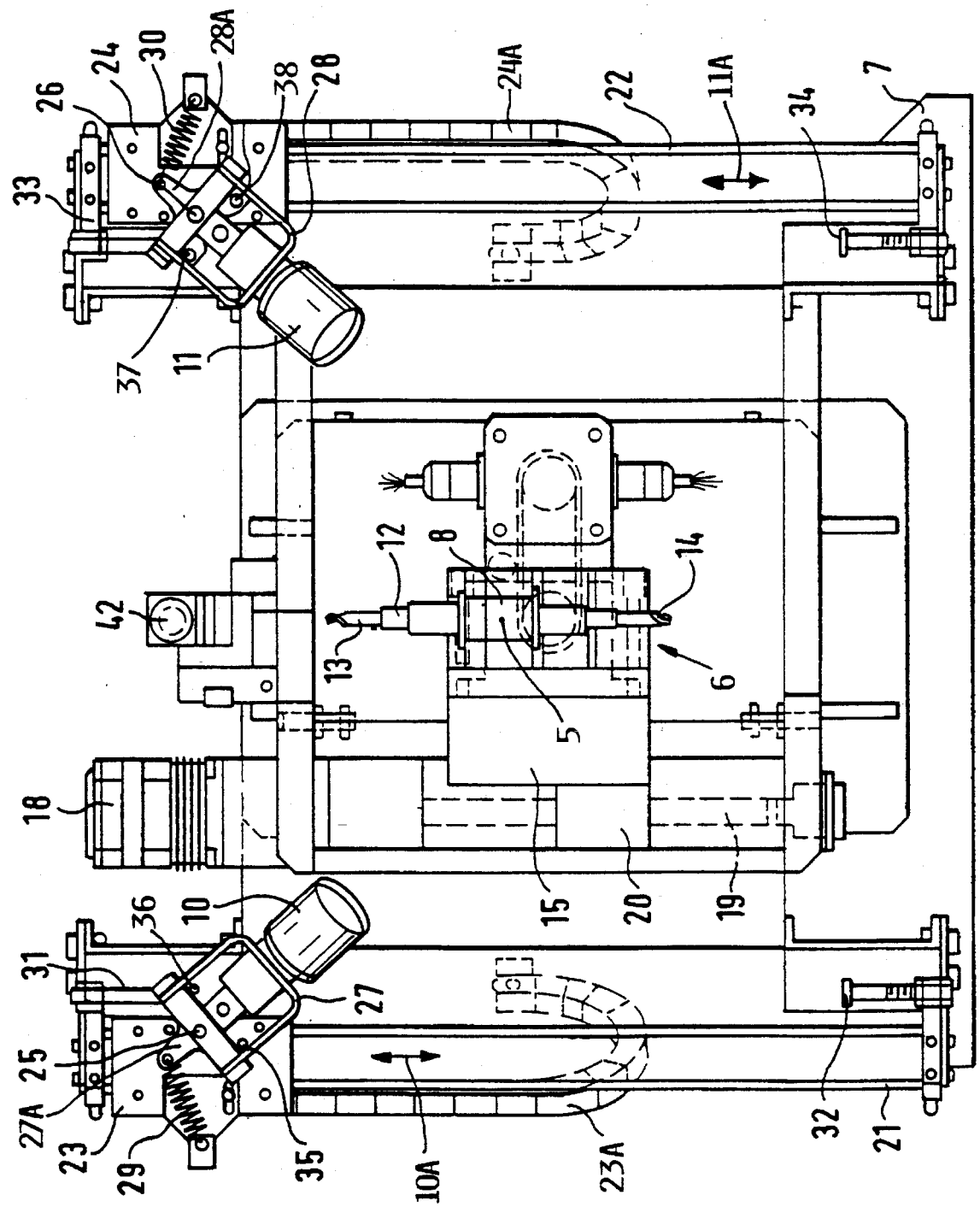
FIG. 4 is a view in the direction of the arrow IV in FIG. 1.

Referring to FIGS. 3 and 4 in conjunction, the drilling unit 6 is viewed in FIG. 4 in the direction of the axis 5 which extends perpendicularly to the plane of the drawing sheet of FIG. 4. The spindle head 8 with the drill spindle 12 and the drill bits 13 and 14 are shown in the center of FIG. 4. The drive or rather feed advance motor 18, the spindle 19 and the carriage 15 with the spindle nut 20 are also schematically shown in FIG. 4. Two pneumatic piston cylinder devices 21 and 22 are shown as drives for the cameras 10 and 11 respectively. These piston cylinder drives 21 and 22 are of the type that do not have a piston rod. The camera 10 is mounted on a camera carrying slide 23 that is driven by the piston cylinder device 21. For this purpose, the slide 23 is secured to the piston through a longitudinal seal in the cylinder so that movement of the piston drives the slide 23 and hence the camera vertically up and down as shown in FIG. 4 by the double arrow 10A. The mounting and drive of the video camera 11 is identical to that of the camera 10. The camera 11 is mounted on a camera carrier slide 24 that is movable up and down as indicated by the arrow 11A. Flexible cables 23A and 24A connect the respective slides 23 and 24 and thus the corresponding cameras 10 and 11 to the central processing unit of the robot. The slide 23 carries a journal shaft 25 to tiltably mount a bracket 27 that carries the camera 10. Similarly, the slide 24 carries a journal shaft 26 to tiltably mount a bracket 28 carrying the camera 11. A tension spring 29 is arranged between a fixed point on the slide 23 and a lever 27A forming part of the camera mounting bracket 27. Similarly, a tension spring 30 is mounted between a fixed point of the slide 24 and a lever 28A of a bracket 28. These springs 29 and 30 hold the respective cameras 10 and 11 in a horizontal alignment when no other forces are effective on the cameras.

Referring further to FIG. 4, end stop sensors 31 and 32 are provided at the upper and lower end respectively of the piston cylinder device 21 for controlling the upward and downward movement of the camera carrying slide 23. Similarly, upper and lower stop sensors 33 and 34 are arranged for cooperation with the slide 24 driven by the piston cylinder device 22. The stop sensors 31 and 32, as well as 33 and 34 are adjustable in their position, for example by a threading. The slide 23 carries two pins 35 and 36 for controlling the tilting motion of the bracket 27 about its journal shaft 25. Similarly, the slide 24 carries two pins 37 and 38 for controlling the tilting motion of the bracket 28 about journal shaft 26. The two pins 36 and 38 are adjustable in their position along an elongated hole. The pins 35 and 36 are shown symbolically and they are so positioned that one pin 35 or 36 cooperates with the stop sensor 31 while the other pin cooperates with the stop sensor 32. Similarly, one of the pins 37 and 38 cooperates with the stop sensor 33, while the other pin cooperates with the stop sensor 34.

As shown in FIG. 4, the cameras 10 and 11 are in their uppermost position and trained onto the drill bit 14. In this position, normal drilling by the drill bit 14 is monitored by the cameras 10 and 11. If it is now intended, for example, to use the upwardly pointing drill bit 13, it is necessary to bring the cameras 10 and 11 into their lowermost position. For this purpose, the piston cylinder drive 21 moves the slide 23 downwardly and the piston cylinder 22 moves the slide 24 downwardly. As a result of this movement, for example the pins 35 and 37 move away from the stops 31 and 33, whereby the cameras 10 and 11 tilt under the influence of the respective tension spring 29 and 30 into a horizontal orientation. In other words, the bracket 27 tilts counterclockwise while the bracket 28 tilts clockwise. As the two slides 23 and 24 reach their lowermost position, the pins 36 and 38 will engage the stops 32 and 34 respectively, whereby further downward movement of the slides 23 and 24 will orient the cameras 10 and 11 upwardly so as to view the drill bit 13. Thus, the drilling tool 1 is ready to use the bit 13 for an overhead drilling.

Figure 5:
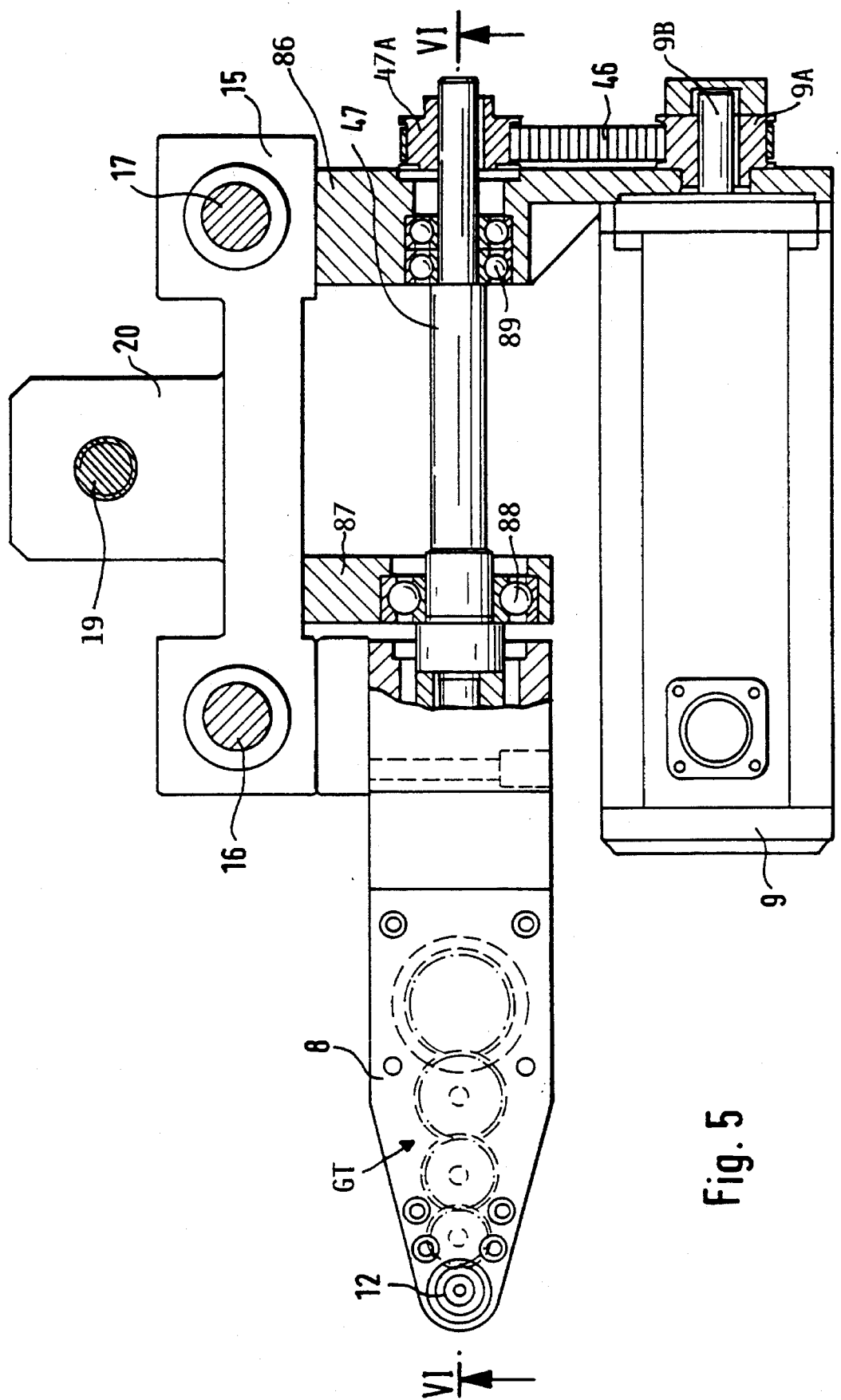
FIG. 5 is an enlarged view, partially in section, of the spindle carrier and its slide, including the spindle rotational drive also shown on a smaller scale in FIG. 3.

FIG. 5 shows the spindle head 8 and the details of the drive for rotating the spindle 12. This drive is derived from the above mentioned motor 9 which is flanged to an extension 86 of the vertical slide 15 that is movable up and down along the guide columns 16 and 17 by the rotation of the spindle 19 engaging the spindle nut 20 rigidly connected to the slide 15. A further extension 87 also rigidly secured to the slide 15 and the extension 86 hold bearings 88 and 89 in which a drive shaft 47 for rotating the spindle 12 is rotatably mounted. A gear pulley 9A is rigidly secured to an output shaft 9B of the motor 9 for driving a gear belt 46 running around a further gear pulley 47A rigidly secured to an outer end of the drive shaft 47. The connection between the shaft 47 and the spindle 12 is provided by a gear train GT to be described below with reference to FIG. 6.

Referring to FIG. 6, the left-hand end of the shaft 47 is connected through a bushing 48A to a bevel gear 48B mounted in a gear box 48 on a bearing 48C. The gear box 48 forms part of the spindle head 8. The bevel gear 48B meshes with a further bevel gear 49 mounted on bearings 49A and 49B. The bevel gear 49 is rigidly connected with a spur gear 50 that meshes with a spur gear 51 which in turn meshes with a spur gear 52. A further spur gear 53 meshes with a gear 54 centrally and rigidly connected to the spindle 12 as well as with the gear 52, thereby closing the drive train from the output of the motor 9 to the spindle 12. The gear wheels just described are so selected that the spindle 12 is driven with the desired rotational speed. Each of the gear wheels just mentioned is mounted on a respective shaft by a respective bearing as best seen in FIG. 6.

These gears apply a rotation of about 6000 r.p.m. to the spindle 12 for drilling precision fit holes, e.g. rivet holes, into the work piece WP made of aluminum alloys as are conventionally used, e.g. in the aircraft industry. In order to sustain such relatively high r.p.m.s, the drill bits 13 and 14 are cooled and constantly cleaned as will be described in more detail below with reference to FIGS. 8 and 9.

FIG. 7 shows the lower end of the drill spindle 12 provided with a coaxial bore 55 concentric to the spindle axis 2. The inner end of the bore 55 is provided with a threading 56 in which the drill bit 14 is received and held. The upper end of the spindle 12 is constructed in the same way. The threaded portion 56 of the bore 55 has a smaller diameter than the unthreaded portion of the bore 55. The diameter and the eccentricity or radial deviation of the bore 55 and portion 56 must be maintained within defined narrow tolerances in order to assure the precision drilling of precision bores in a single drilling pass without any reaming.

The drill bits 13 and 14 are preferably so-called countersink drill bits, whereby a precision bore hole and a countersink can be drilled in a single pass provided that the above mentioned tolerances are maintained for the bit holding bores 55 and the threadings 56. It is an advantage of the invention that so-called precision bore holes, each with its respective countersink depression, can now be produced in a single pass, even in difficult to access locations on the work piece. Heretofore, at least two work steps were necessary in sequence, namely predrilling and countersinking and possibly also reaming for forming such precision bore holes with a countersink as are required for riveting flat head rivets.

Figure 8:
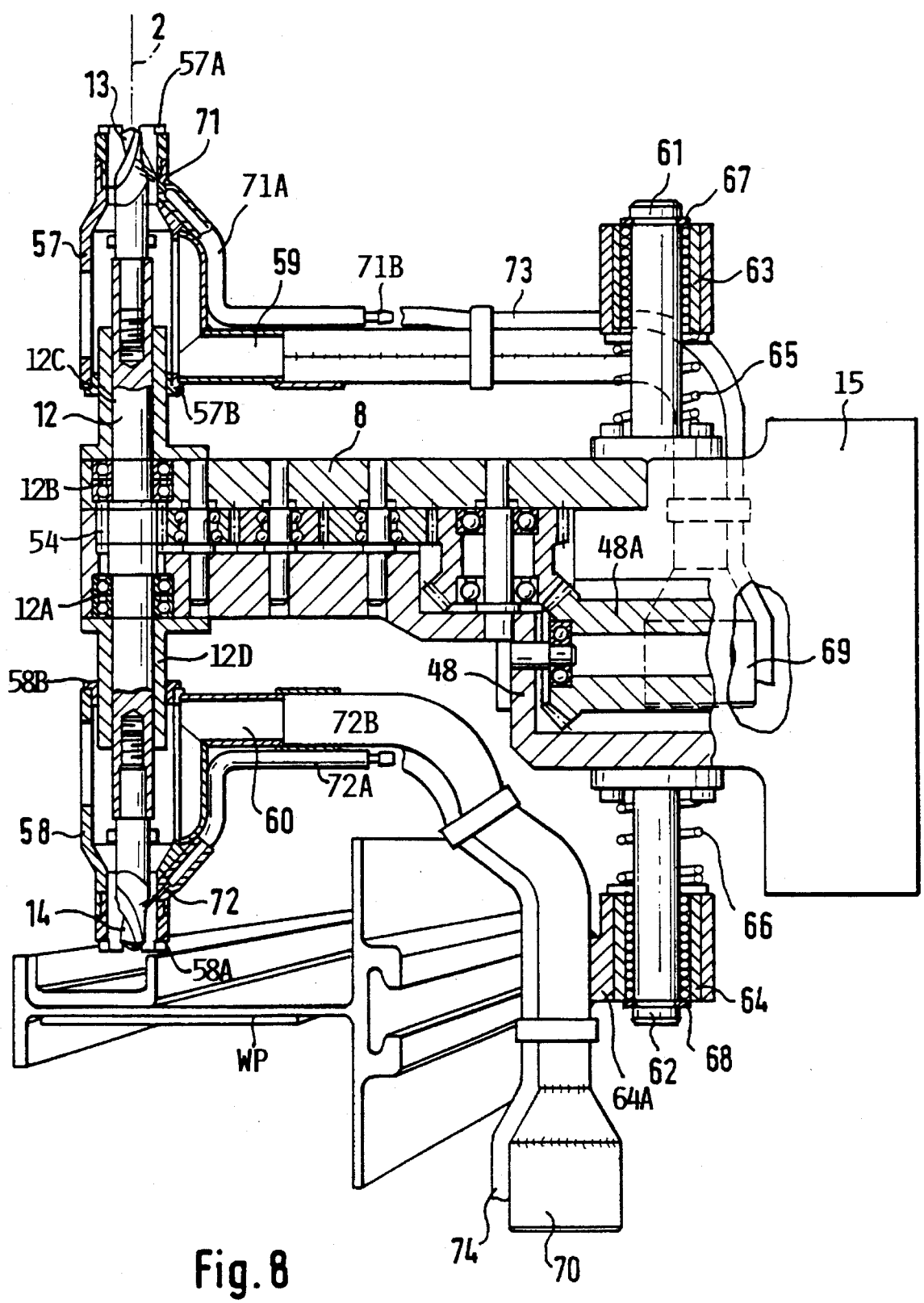
FIG. 8 shows an enlarged view similar to that of FIG. 6, however, illustrating chip removing suction ducts and cooling ducts positioned for cooperation with the respective drill bit.

FIG. 8 shows a side view of the spindle head 8, partially in section, and on an enlarged scale to illustrate an embodiment of the invention which is provided with a boring chip suction device 59 and 60 for each of the drill bits 13 and 14 respectively, and which also comprises a cooling device 71 and 72 respectively for each of the drill bits. Each drill bit is enclosed by an exhaust hood or enclosure 57, 58 respectively. The suction device is formed as a suction pipe 59, 60 respectively which is connected through a coupling 69, 70 respectively to a source of suction, such as a suction fan, not shown, but part of the riveting robot R. Two guide rods 61 and 62 are secured to the spindle head 8 and thus to the carriage 15 that moves up and down along the posts 16 and 17 as described above. The guide rods 61 and 62 extend in parallel to the longitudinal axis 2 of the spindle 12. A guide bushing 63 is slideably mounted on the guide rod 61. A spring ring 67 holds the guide bushing 63 against sliding off the free end of the guide rod 61 under the bias of a spring 65. Similarly, a guide bushing 64 is mounted on the guide rod 62 and held in place by a spring ring 68 against the bias of a spring 66. The spring 65 bears against the upper portion of the spindle head 8. The spring 66 bears against the gear box 48 forming part of the spindle head 8. Preferably, both guide bushings 63 and 64 are so-called ball boxes.

The suction pipe or duct 59 is secured to the guide bushing 63. The suction duct 60 is secured to the guide bushing 64 by a mounting member 64A. Thus, the suction pipes 59 and 60 with their suction hoods 57 and 58 respectively can yield when the spindle 12 and thus the respective bits 13 and 14 are feed advanced into the work piece while the edge 57A of the upper hood 57 or the edge 58A of the lower hood 58 bears against the work piece during the feed advance of the drilling operation. When the spindle 12 is returned to the centered normal position, the springs 65 and 66 make sure that the drill bits 13 and 14 are inside the suction hoods 57 and 58 respectively. The hood 57 is slideably mounted by a slide bearing 57B on a spindle housing 12C. Similarly, the hood 58 is slideably mounted by a slide bearing 58B on a housing section 12D of the spindle housing. Thus, each of the suction hoods 57, 58 is slideable relative to the spindle housing and the spindle head 8 in the direction of the spindle axis 2 against the bias of the respective spring 65, 66. The springs urge the suction hoods 57, 58 into the position shown in FIG. 8.

A pipe section 71A leads to a spray nozzle 71 that is adapted to spray a cooling and lubricating fluid against the drill bit 13. A nipple 71B leads into a flexible hose 73 that is connected to the suction duct 59. Similarly, a pipe section 72A that has a nozzle 72 at one of its ends for spraying a cooling fluid against the drill bit 14, connects with a nipple 72B to a flexible hose 74. Both flexible hoses 73 and 74 lead to a source of cooling fluid that is pumped by a conventional pump through the hoses 73, 74 and through the nozzles 71, 72 for cooling the drill bits. The couplings 69 and 70 lead, preferably also through flexible hoses to a pump for applying the suction necessary for the removal of any drilling chips. It is preferred to continue the suction even during pauses of the drilling operation so as to keep the work piece clean.

The cooling and lubricating of the drill bits 13 and 14 is accomplished with the nozzles 71 and 72. For this purpose, these nozzles are so oriented that the respective spray engulfs the respective drill bit 13 and 14. The supply hoses 73 and 74 may be provided with respective valves, not shown and the pressurized fluid is preferably a mixture of air and a lubricant.

Figure 9:
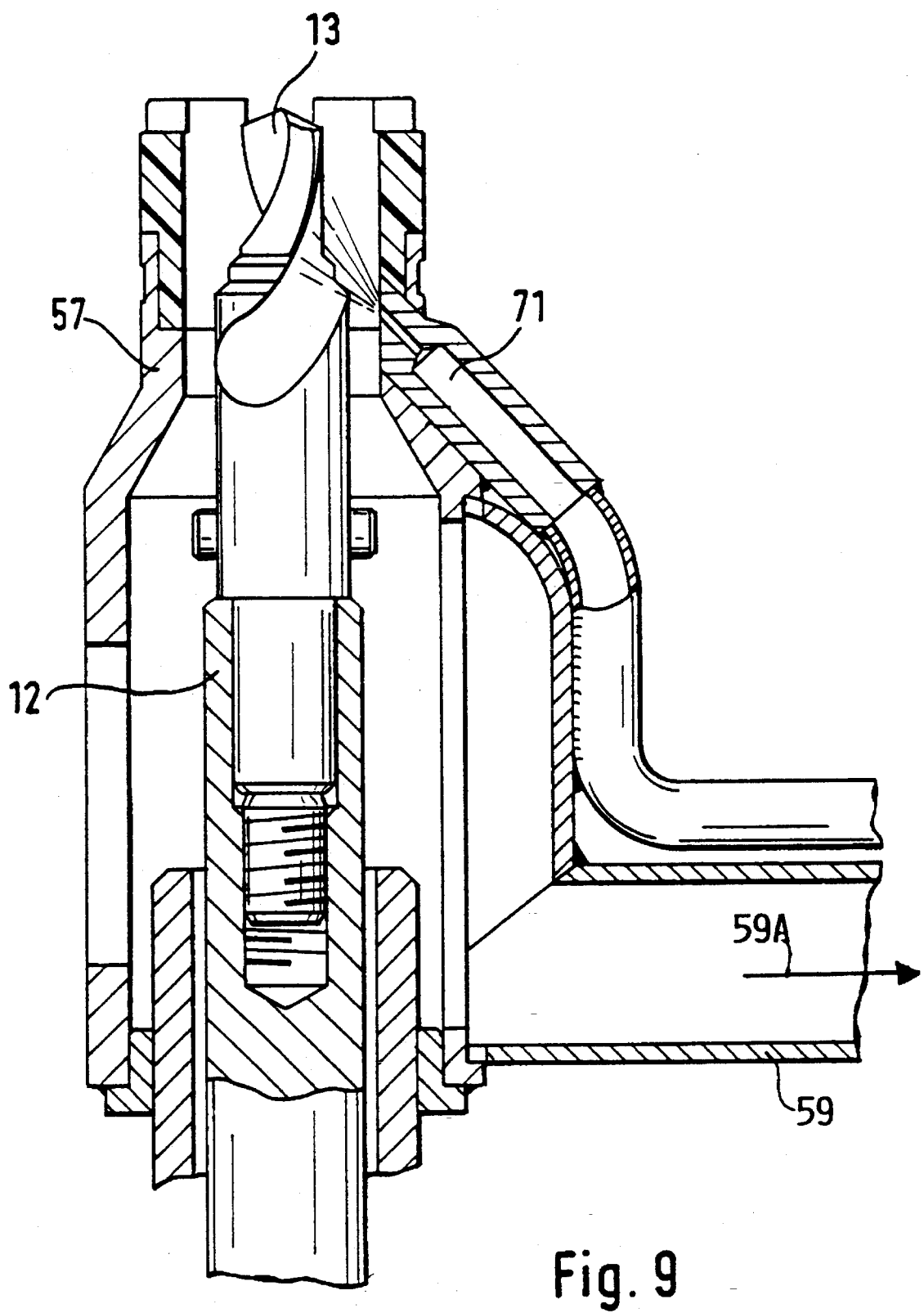
FIG. 9 shows on an enlarged scale a chip suction duct for removing drilling chips and a spray channel with a nozzle for cooling a drill bit.

FIG. 9 shows, on an enlarged scale, the suction hood 57 and the connection of the spraying nozzle 71 into the hood 57 at the required spraying angle. Preferably, the lubricating and cooling takes place through short bursts of fluid applied directly upon completion of a bored hole through the nozzle 71. By the continuous application of the suction, it is assured that any excess lubricant is not able to reach the work piece, but instead is carried off through the duct 59 as indicated by the arrow 59A. Similarly, the lubricant applied to the drill bit 14 is carried off through the suction duct 60. If the lubricant is to be reused, it will be passed through a screen or filter to remove the drilling chips. The just described continuous application of the suction through the ducts 59 and 60 also provides a certain additional cooling effect on the drill bits 13 and 14.

Although the invention has been described with reference to specific example embodiments, it will be appreciated, that it is intended to cover all modifications and equivalents within the scope of the appended claims.

What we claim is:

1. An automatic drilling tool, comprising means for connecting and coupling said drilling tool to a robot, said connecting means including a support console (3), a spindle head (8), a drilling head (6) supported by said spindle head (8), a drilling spindle (12) and bearings rotatably mounting said drilling spindle (12) in said drilling head (6), a first motor (9) for rotating said drilling spindle (12), a support slide (15) on which said spindle head (8) and said first motor (9) are mounted, a guide mechanism (16, 17) for said support slide (15) for guiding a movement of said support slide (15) in a Z-direction of an XYZ coordinate system, a second motor (18) for moving said slide (15) in said Z-direction, said guide mechanism (16, 17) being mounted to said support console (3) for establishing a guide direction in parallel to a central longitudinal first axis (2) of said drilling spindle (12), a drive train (GT) connected between said drilling spindle (12) and said first motor (9) for said rotating of said drilling spindle (12), at least one device for axially holding a drill bit (13, 14) in a free end of said drilling spindle (12), said support console (3) having a longitudinal second axis (5) extending perpendicularly to said central longitudinal first axis (2) of said drilling spindle (12), and means (4) mounting said support console (3) to said robot for rotation about said second axis (5) of said support console (3), wherein said drilling spindle (12) has two free ends and a drill bit holding bore (55, 56) in each free spindle end, and wherein said second axis (5) intersects said first axis (2) substantially centrally in said drilling spindle (12).

2. The drilling tool of claim 2, wherein each of said drill bit holding bores (55, 56) is an integral component of the respective drilling spindle end.

3. The drilling tool of claim 1, wherein said drive train (GT) for said drilling spindle (12) comprises a gear belt (46) driven by said first electric motor (9), and gear belt pulleys (9A, 47A) connected for driving said drilling spindle (12) through said gear belt (46).

4. The drilling tool of claim 3, wherein said first and second electric motors (9, 18) are controllable in a closed loop control circuit.

5. The drilling tool of claim 1, further comprising a feed advance drive (19, 20) driven by said second motor (18) for feed advancing said drilling spindle (12) along said longitudinal first axis (2) of said drilling spindle (12).

6. The drilling tool of claim 5, wherein said electric motor (18) is a stepping motor.

7. The drilling tool of claim 5, wherein said feed advance drive comprises a feed spindle (19) and a spindle nut (20) on said feed spindle (19), said guide mechanism comprising a mounting guide frame (16, 17) for said feed spindle (19), bearings (39, 40) rotatably supporting said feed spindle (19) in said guide frame, said second motor (18) being connected to said feed spindle (19) for rotating said feed spindle (19), said support slide (15) and said spindle head (8) being connected to said spindle nut (20).

8. The drilling tool of claim 1, further comprising a measuring sensor (42) for sensing position coordinates and a protection tubular member (43) for mounting and protecting measuring sensor (42).

9. The drilling tool of claim 8, further comprising a first feed drive (44) for moving said measuring sensor (42) and said protection tubular member (43) together, and a second feed drive (45) for moving said measuring sensor (42) out of and into said protection tubular member (43).

10. The drilling tool of claim 1, further comprising at least one video camera (10, 11) positioned for monitoring a drill bit (13, 14) operation, and a positioning device (21, 22) for directing said video camera onto a drill bit.

11. The drilling tool of claim 10, wherein said positioning device comprises at least one piston cylinder device (21 or 22) for positioning said video camera.

12. The drilling tool of claim 11, wherein said piston cylinder device comprises a cylinder and a piston without a piston rod, said video camera being connected to said piston.

13. The drilling tool of claim 1, further comprising a suction hood (57, 58) supported by said spindle head (8) and positioned to enclose said drilling spindle (12) for removing bore chips by suction.

14. The drilling tool of claim 1, further comprising at least one spray nozzle (71, 72) supported by said spindle head (8) for spraying a fluid onto a drill bit (13, 14) operated by said drilling spindle (12), said fluid providing lubrication and cooling.

15. The drilling tool of claim 14, further comprising a suction hood (57, 58) supported by said spindle head (8) and positioned to enclose said drilling spindle (12) for removing bore chips by suction, said at least one spray nozzle (71, 72) being mounted to said suction hood, and wherein said spray nozzle has a nozzle opening communicating with a space enclosed by said suction hood for transporting bore chips and sprayed fluid back to a collection.

16. An automatic drilling tool, comprising means for connecting and coupling said drilling tool to a robot, said connecting means including a support console (3), a spindle head (8), a drilling head (6) supported by said spindle head (8), a drilling spindle (12) and bearings rotatably mounting said drilling spindle (12) in said drilling head (6), a first motor (9) for rotating said drilling spindle (12), a support slide (15) on which said spindle head (8) and said first motor (9) are mounted, a guide mechanism (16, 17) for said support slide (15) for guiding a movement of said support slide (15) in a Z-direction of an XYZ coordinate system, a second motor (18) for moving said slide (15) in said Z-direction, said guide mechanism (16, 17) being mounted to said support console (3) for establishing a guide direction in parallel to a central longitudinal first axis (2) of said drilling spindle (12), a drive train (GT) connected between said drilling spindle (12) and said first motor (9) for said rotating of said drilling spindle (12), at least one device for axially holding a drill bit (13, 14) in a free end of said drilling spindle (12), said support console (3) having a longitudinal second axis (5) extending perpendicularly to said central longitudinal first axis (2) of said drilling spindle (12), and means (4) mounting said support console (3) to said robot for rotation about said second axis (5) of said support console (3), said drilling tool further comprising a measuring sensor (42) for sensing position coordinates and a protection tubular member (43) for mounting and protecting said measuring sensor (42).

17. The drilling tool of claim 16, further comprising a first feed drive (44) for moving said measuring sensor (42) and said protection tubular member (43) together, and a second feed drive (45) for moving said measuring sensor (42) out of and into said protection tubular member (43).

18. An automatic drilling tool, comprising means for connecting and coupling said drilling tool to a robot, said connecting means including a support console (3), a spindle head (8), a drilling head (6) supported by said spindle head (8), a drilling spindle (12) and bearings rotatably mounting said drilling spindle (12) in said drilling head (6), a first motor (9) for rotating said drilling spindle (12), a support slide (15) on which said spindle head (8) and said first motor (9) are mounted, a guide mechanism (16, 17) for said support slide (15) for guiding a movement of said support slide (15) in a Z-direction of an XYZ coordinate system, a second motor (18) for moving said slide (15) in said Z-direction, said guide mechanism (16, 17) being mounted to said support console (3) for establishing a guide direction in parallel to a central longitudinal first axis (2) of said drilling spindle (12), a drive train (GT) connected between said drilling spindle (12) and said first motor (9) for said rotating of said drilling spindle (12), at least one device for axially holding a drill bit (13, 14) in a free end of said drilling spindle (12), said support console (3) having a longitudinal second axis (5) extending perpendicularly to said central longitudinal first axis (2) of said drilling spindle (12), and means (4) mounting said support console (3) to said robot for rotation about said second axis (5) of said support console (3), said drilling tool further comprising at least one video camera (10, 11) positioned for monitoring a drill bit (13, 14) operation, and a positioning device (21, 22) for directing said video camera onto a drill bit.

19. The drilling tool of claim 18, wherein said positioning device comprises at least one piston cylinder device (21 or 22) for positioning said video camera.

* * * * *